US008753530B2

(12) United States Patent
Hattori et al.

(10) Patent No.: US 8,753,530 B2
(45) Date of Patent: Jun. 17, 2014

(54) MAGNETIC PARTICLE AND METHOD OF PREPARING THE SAME

(75) Inventors: Yasushi Hattori, Minami-ashigara (JP); An-Pang Tsai, Sendai (JP); Satoshi Kameoka, Sendai (JP)

(73) Assignees: FUJIFILM Corporation, Tokyo (JP); Tohoku University, Miyagi (JP)

( * ) Notice: Subject to any disclaimer, the term of this patent is extended or adjusted under 35 U.S.C. 154(b) by 208 days.

(21) Appl. No.: 13/189,070

(22) Filed: Jul. 22, 2011

(65) Prior Publication Data

US 2012/0018665 A1 Jan. 26, 2012

(30) Foreign Application Priority Data

Jul. 23, 2010 (JP) ................................ 2010-165569

(51) Int. Cl.
*H01F 1/00* (2006.01)
*H01F 1/06* (2006.01)
*G11B 5/62* (2006.01)
*G11B 5/712* (2006.01)

(52) U.S. Cl.
USPC .................. 252/62.63; 427/126.1; 427/126.5; 427/130; 427/216; 427/215; 427/217; 428/403

(58) Field of Classification Search
USPC ........................ 252/62.55, 61.51 R; 428/403; 427/126.1, 126.5, 130, 217, 216, 215
See application file for complete search history.

(56) References Cited

U.S. PATENT DOCUMENTS 3,856,580 A * 12/1974 Smeggil et al. ............... 148/105
6,592,938 B1 * 7/2003 Pessey et al. ................ 427/212

FOREIGN PATENT DOCUMENTS

JP 01-222407 A 9/1989

OTHER PUBLICATIONS

Y. Inaba, et al., "Preliminary study of Hard/Soft-stacked Perpendicular Recording Media," Journal of the Magnetics Society of Japan, 2005, pp. 239-242, vol. 29, No. 3.
Office Action dated Dec. 3, 2013 in Japanese Application No. 2010-165569.

* cited by examiner

*Primary Examiner* — Carol M Koslow
(74) *Attorney, Agent, or Firm* — Sughrue Mion, PLLC

(57) ABSTRACT

An aspect of the present invention relates to a method of preparing a magnetic particle, which comprises attaching a transition metal-containing organic compound to a surface of a hard magnetic particle and then thermally decomposing the transition metal-containing organic compound to obtain the magnetic particle.

10 Claims, No Drawings

MAGNETIC PARTICLE AND METHOD OF PREPARING THE SAME

CROSS-REFERENCE TO RELATED APPLICATIONS

This application claims the benefit of priority under 35 USC 119 to Japanese Patent Application No. 2010-165569 filed on Jul. 23, 2010, which is expressly incorporated herein by reference in its entirety.

BACKGROUND OF THE INVENTION

1. Field of the Invention

The present invention relates to a magnetic particle and to a method of preparing the same. More particularly, the present invention relates to a magnetic particle that has magnetic characteristics suited to magnetic recording and that can be employed in a particulate magnetic recording medium, and to a method of preparing the same.

2. Discussion of the Background

In widely employed magnetic recording media, such as video tapes, computer tapes, and disks, the smaller the particles of magnetic material, the higher the SNR becomes for a given content of magnetic material in the magnetic layer. This is advantageous for high-density recording.

However, as the size of the magnetic particles decreases, superparamagnetism ends up occurring due to thermal fluctuation, precluding use in a magnetic recording medium. By contrast, materials of high crystal magnetic anisotropy have good thermal stability due to a high potential for thermal stability. Accordingly, research has been conducted into materials of high crystal magnetic anisotropy as magnetic materials of good thermal stability. For example, high crystal magnetic anisotropy has been achieved by adding Pt to a CoCr-based magnetic material in hard disks (HD) and the like. Investigation has also been conducted into the use of CoPt, FePd, FePt, and the like as magnetic materials of higher crystal magnetic anisotropy. Further, magnetic materials containing rare earth elements, such as SmCo, NdFeB, and SmFeN, are known to be magnetic materials that do not contain expensive Pt, that are inexpensive, and that exhibit high crystal magnetic anisotropy (referred to as "Technique 1", hereinafter).

Although materials of high crystal magnetic anisotropy afford good thermal stability, an increase in the switching magnetic field necessitates a large external magnetic field for recording, compromising recording properties. Accordingly, the Journal of the Magnetics Society of Japan 29, 239-242 (2005), which is expressly incorporated herein by reference in its entirety, describes attempts that have been made to reduce the switching magnetic field by stacking a soft magnetic layer and a hard magnetic layer formed as gas phase films on a nonmagnetic inorganic material to produce exchange coupling interaction (referred to as "Technique 2", hereinafter).

In metal thin-film magnetic recording media such as HD media, a glass substrate capable of withstanding high temperatures during vapor deposition is normally employed as the support. By contrast, particulate magnetic recording media affording good general-purpose properties and employing inexpensive organic material supports have been proposed in recent years, and are widely employed as video tapes, computer tapes, flexible disks, and the like. From the perspective of maintaining the general-purpose properties of such particulate media, it is difficult in practical terms to employ a magnetic material in which expensive Pt is used.

Thus, the use of a magnetic material comprising a rare earth element such as in Technique 1 is conceivable. However, as set forth above, improvement of recording properties is required for magnetic materials of high crystal magnetic anisotropy.

Accordingly, the application of Technique 2 to particulate magnetic recording media is conceivable to achieve both thermal stability and recording properties. However, in Technique 2, the support is exposed to high temperatures during gas phase film formation. Thus, it is difficult to apply this technique to nonmagnetic organic material supports usually employed in particulate magnetic recording media because these supports are of poorer heat resistance.

SUMMARY OF THE INVENTION

Accordingly, an aspect of the present invention provides for a magnetic particle that can be applied to particulate magnetic recording media and that has both thermal stability and good recording properties.

The present inventors conducted extensive research into achieving the above magnetic particle. As a result, they discovered that by attaching a transition metal-containing organic compound to the surface of a hard magnetic particle and then thermally decomposing the transition metal-containing organic compound, it became possible to control the coercive force within a range suited to recording while maintaining the thermal stability of the hard magnetic particle. The reasons for this were presumed by the present inventors to be as follows.

Thermally decomposing a transition metal-containing organic compound on the surface of a hard magnetic particle can coat the surface of the hard magnetic particle with the thermal decomposition product of the transition metal-containing compound. As a result, a core/shell structure is thought to form, with a hard magnetic particle as the core and the thermal decomposition product as the shell. The shell portion is presumed to be a soft magnetic material of lower coercive force than the core portion (hard magnetic portion) and to exchange couple with the core portion. In magnetic particles having such a structure, when the external magnetic field changes, the shell portion first undergoes a change in spin direction corresponding to the change in the external magnetic field, thus causing the direction of spin of the core portion, which is exchange coupled to the shell portion, to change. As a result, this makes it possible to lower the switching field of the magnetic particle (to reduce the coercive force). However, since a hard magnetic particle is present within the magnetic particle, the thermal stability due to the high crystal magnetic anisotropy thereof can be maintained. The present inventors surmised that this was what made it possible to obtain magnetic particles having both high thermal stability and good recording properties. In contrast to the difficulty encountered in applying Technique 2 set forth above to particulate magnetic recording media, the method discovered by the present inventors can be applied as a method for preparing magnetic particles for particulate magnetic recording media. In the present invention, the term "exchange coupling" refers to coupling of a hard magnetic material and a soft magnetic region such that the spin orientation is aligned by exchange interaction, the spin of the hard magnetic material and the spin of the soft magnetic region operate in concerted fashion, and the orientation of the spin changes as a single magnetic material. When a soft magnetic material (soft magnetic phase) is present on the surface of a hard magnetic material (hard magnetic phase) without undergoing exchange coupling, the coercive force of the magnetic material will not change depending on the presence or absence of the soft magnetic phase. Accordingly, the fact that a hard magnetic phase and a soft magnetic phase have exchange-coupled can be confirmed based on whether or not the coercive force of the magnetic particle is reduced by formation of the soft magnetic phase. Further, when a soft magnetic phase is present on the surface of a hard magnetic phase without undergoing exchange coupling, the M-H loop (hysteresis loop) becomes the sum of the M-H loop of the soft magnetic phase with the M-H loop of the hard magnetic phase. Thus, in places corresponding to the coercive force of the soft magnetic phase, segments appear in the M-H loop. Accordingly, exchange coupling of a hard magnetic phase and a soft magnetic phase can be confirmed from the shape of the M-H loop.

The present invention was devised on the basis of the above knowledge.

An aspect of the present invention relates to a method of preparing a magnetic particle, which comprises attaching a transition metal-containing organic compound to a surface of a hard magnetic particle and then thermally decomposing the transition metal-containing organic compound to obtain the magnetic particle.

The thermal decomposition may be carried out by gas phase thermal decomposition.

The transition metal-containing organic compound may be a transition metal complex having a ligand in the form of an acetylacetonate compound.

The above method may comprises attaching the transition metal-containing organic compound to the surface of the hard magnetic particle by removing a solvent from a solution containing the transition metal-containing organic compound and the hard magnetic particle.

The magnetic particle obtained may have a coercive force lower than that of the hard magnetic particle.

A further aspect of the present invention relates to a magnetic particle obtained by the method of preparing set forth above.

A still further aspect of the present invention relates to a magnetic particle, which comprises a hard magnetic particle and a thermal decomposition product of a transition metal-containing organic compound deposited on a surface of the hard magnetic particle in a state where the thermal decomposition product is exchange-coupled with the hard magnetic particle.

The transition metal-containing organic compound may be a transition metal complex having a ligand in the form of an acetylacetonate compound.

The thermal decomposition product may be a gas phase thermal decomposition product of the transition metal-containing organic compound.

The above magnetic particle may have a coercive force of equal to or higher than 80 kA/m but less than 230 kA/m.

The above magnetic particle may be employed as magnetic powder for magnetic recording.

The above magnetic particle may be employed as magnetic powder for a particulate magnetic recording medium.

The present invention can provide a magnetic particle of high thermal stability and of a coercive force suited to recording that can be employed in particulate magnetic recording media.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms “a,” “an,” and “the” include the plural reference unless the context clearly dictates otherwise.

Except where otherwise indicated, all numbers expressing quantities of ingredients, reaction conditions, and so forth used in the specification and claims are to be understood as being modified in all instances by the term “about.” Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

An aspect of the present invention relates to:

a method of preparing a magnetic particle, which comprises attaching a transition metal-containing organic compound to a surface of a hard magnetic particle and then thermally decomposing the transition metal-containing organic compound to obtain the magnetic particle; and a magnetic particle obtained by the method of preparing set forth above. As described above, the present invention can improve the recording property of a hard magnetic particle while maintaining the thermal stability thereof by thermally decomposing a transition metal-containing organic compound on the surface of the hard magnetic particle.

The present invention will be described in greater detail below.

Hard Magnetic Particle

In the present invention, “hard magnetism” refers to a coercive force of equal to or higher than 230 kA/m. That is, the above hard magnetic particle has a coercive force of equal to or higher than 230 kA/m. A hard magnetic particle with a coercive force of equal to or higher than 230 kA/m has high crystal magnetic anisotropy, and will thus have good thermal stability. The magnetic particle of the present invention has a hard magnetic particle as its core, and can thus achieve high thermal stability.

Additionally, as set forth above, the thermal decomposition product of the transition metal-containing organic compound in the magnetic particle of the present invention is thought to be a soft magnetic material of lower coercive force than the hard magnetic particle constituting the core portion. The coercive force of the thermal decomposition product is desirably less than 8 kA/m from the perspective of keeping the coercive force of the magnetic particle within a range suited to recording.

The constant of crystal magnetic anisotropy of the hard magnetic particle (also referred to as the "hard magnetic phase" hereinafter) is desirably equal to or higher than $1\times10^{-1}$ J/cc ($1\times10^{6}$ erg/cc), preferably equal to or higher than $6\times10^{-1}$ J/cc ($6\times10^{6}$ erg/cc). The greater the crystal magnetic anisotropy, the smaller the magnetic particle can be and the greater the advantage afforded in terms of electromagnetic characteristics, such as the SNR. When the constant of crystal magnetic anisotropy of the hard magnetic phase is equal to or higher than $1\times10^{-1}$ J/cc ($1\times10^{6}$ erg/cc), it is possible to maintain a coercive force suited to magnetic recording when the thermal decomposition product of a transition metal-containing organic compound is formed on the surface. When the constant of crystal magnetic anisotropy of the hard magnetic phase exceeds 6 J/cc ($6\times10^{7}$ erg/cc), the coercive force may increase even when the decomposition product is formed on the surface and recording properties may deteriorate. Thus, the constant of crystal magnetic anisotropy of the hard magnetic phase desirably does not exceed 6 J/cc ($6\times10^{7}$ erg/cc).

From the perspective of recording properties, the saturation magnetization of the hard magnetic particles is desirably $0.4\times10^{-1}$ to 2 $A\cdot m^2/g$ (40 to 2,000 emu/g), preferably $5\times10^{-1}$ to 1.8 $A\cdot m^2/g$ (500 to 1,800 emu/g). They can be of any shape, such as spherical or polyhedral. From the perspective of high-density recording, the size (diameter, plate diameter, etc.) of the hard magnetic particles is desirably 3 to 100 nm, preferably 5 to 10 nm. The "particle size" in the present invention can be measured by a transmission electron microscope (TEM). The average particle size in the present invention is defined as the average value of the particle sizes of 500 particles randomly extracted and measured in a photograph taken by a transmission electron microscope.

Examples of the hard magnetic phase are magnetic materials comprised of rare earth elements and transition metal elements; oxides of transition metals and alkaline earth metals; and magnetic materials comprised of rare earth elements, transition metal elements, and metalloids (also referred to as "rare earth-transition metal-metalloid magnetic materials" hereinafter). From the perspective of obtaining a suitable constant of crystal magnetic anisotropy set forth above, rare earth-transition metal-metalloid magnetic materials and hexagonal ferrite are desirable. Depending on the type of hard magnetic particle, there are times when oxides such as rare earth oxides will be present on the surface of the hard magnetic particle. Such hard magnetic particles are also included among the hard magnetic particles in the present invention.

More detailed descriptions of rare earth-transition metal-metalloid magnetic materials and hexagonal ferrite are given below.

(Rare Earth-Transition Metal-Metalloid Magnetic Material)

Examples of rare earth elements are Y, Ce, Pr, Nd, Sm, Gd, Tb, Dy, Ho, Er, Tm, and Lu. Of these, Y, Ce, Pr, Nd, Gd, Tb, Dy, Ho, Pr, Nd, Tb, and Dy, which exhibit single-axis magnetic anisotropy, are preferred; Y, Ce, Gd, Ho, Nd, and Dy, which having constants of crystal magnetic anisotropy of $6\times10^{-1}$ J/cc to 6 J/cc ($6\times10^{6}$ erg/cc to $6\times10^{7}$ erg/cc), are of greater preference; and Y, Ce, Gd, and Nd are of even greater preference.

The transition metals Fe, Ni, and Co are desirably employed to form ferromagnetic materials. When employed singly, Fe, which has the greatest crystal magnetic anisotropy and saturation magnetization, is desirably employed.

Examples of metalloids are boron, carbon, phosphorus, silicon, and aluminum. Of these, boron and aluminum are desirably employed, with boron being optimal. That is, magnetic materials comprised of rare earth elements, transition metal elements, and boron (referred to as "rare earth-transition metal-boron magnetic materials", hereinafter) are desirably employed as the above hard magnetic phase. Rare earth-transition metal-metalloid magnetic materials including rare earth-transition metal-boron magnetic materials are advantageous from a cost perspective in that they do not contain expensive noble metals such as Pt, and can be suitably employed to fabricate magnetic recording media with good general-purpose properties.

The composition of the rare earth-transition metal-metalloid magnetic material is desirably 10 atomic percent to 15 atomic percent rare earth, 70 atomic percent to 85 atomic percent transition metal, and 5 atomic percent to 10 atomic percent metalloid.

When employing a combination of different transition metals as the transition metal, for example, the combination of Fe, Co, and Ni, denoted as $Fe_{(1-x-y)}Co_xNi_y$, desirably has a composition in the ranges of x=0 atomic percent to 45 atomic percent and y=25 atomic percent to 30 atomic percent; or the ranges of x=45 atomic percent to 50 atomic percent and y=0 atomic percent to 25 atomic percent, from the perspective of ease of controlling the coercive force of the hard magnetic material to the range of 240 kA/m to 638 kA/m (3,000 Oe to 8,000 Oe).

From the perspective of low corrosion, the ranges of x=0 atomic percent to 45 atomic percent and y=25 atomic percent to 30 atomic percent, or the ranges of x=45 atomic percent to 50 atomic percent and y=10 atomic percent to 25 atomic percent, are desirable.

From the perspective of achieving good temperature characteristics with a Curie point of equal to or higher than 500° C., the ranges of x=20 atomic percent to 45 atomic percent and y=25 atomic percent to 30 atomic percent, or the ranges of x=45 atomic percent to 50 atomic percent and y=0 atomic percent to 25 atomic percent, are desirable.

Accordingly, from the perspectives of coercive force, corrosion, and temperature characteristics, the ranges of x=20 atomic percent to 45 atomic percent and y=25 atomic percent to 30 atomic percent or the ranges of x=45 atomic percent to 50 atomic percent and y=10 atomic percent to 25 atomic percent are desirable, and the ranges of x=30 atomic percent to 45 atomic percent and y=28 atomic percent to 30 atomic percent are preferred.

The hard magnetic particles suitable for use in the present invention can be synthesized by a gas phase method or a liquid phase method. However, high temperatures are required to synthesize a magnetic material of high crystal magnetic anisotropy. Thus, from the perspective of the heat resistance of the support, it is usually difficult to synthesize such a magnetic material on the nonmagnetic organic supports that are generally employed as supports in particulate magnetic recording media. Accordingly, the hard magnetic particles should be synthesized prior to being coated on a nonmagnetic organic support.

One method of obtaining a rare earth-transition metal-boron magnetic material comprises melting the starting material metals in a high-frequency melting furnace and then conducting casting. In this method, since a product containing a large amount of transition metal as primary crystals is obtained, it is necessary to conduct solution heat treatment directly below the melting point to eliminate the transition metal. Since the particle size increases in solution heat treatment, it is desirable to employ the synthesis method set forth further below to obtain a microparticulate magnetic material suited to high-density recording.

In the quenching method in which molten metal is poured onto rotating rolls (molten metal quenching method), Fe in the form of primary crystals is not produced, making it possible to obtain microparticulate (desirably, with a particle size of 3 nm to 200 nm) rare earth-transition metal-boron nanocrystals in a thin quenched band.

Further, forming an amorphous alloy by the quenching method of pouring molten metal onto rotating rolls, followed by the method of conducting a heat treatment at 400° C. to 1,000° C. in a nonoxidizing atmosphere (such as an inert gas, nitrogen, or a vacuum) to precipitate nanocrystals can yield microparticulate (desirably, with a particle size of 3 nm to 200 nm) rare earth-transition metal-boron nanocrystals.

When employing a molten metal quenching method on an alloy, it is desirable to employ an inert gas atmosphere to prevent oxidation. Specific examples of inert gases that are desirably employed are He, Ar, and $N_2$.

In the molten metal quenching method, the quenching rate is determined based on the rotational speed of the rolls and the thickness of the thin quenched band. In the present invention, the rotational speed of the rolls in the course of forming rare earth-transition metal-boron nanocrystals in the thin quenched band immediately following quenching is desirably 10 m/s to 25 m/s. The rotational speed of 25 m/s to 50 m/s is desirable to obtain an amorphous alloy once following quenching.

The thickness of the thin quenched band is desirably 10 μm to 100 μm. It is desirable to control the quantity of molten metal that is poured by means of the orifice or the like to permit a thickness within the above range.

Subsequently, microparticles can be obtained using the method of microparticulating the particles in the course of adsorbing and desorbing hydrogen (the HDDR method), or by gas flow dispersion or wet dispersion.

(Hexagonal Ferrite)

Examples of hexagonal ferrite are barium ferrite, strontium ferrite, lead ferrite, calcium ferrite, and various substitution products thereof such as Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated into the hexagonal ferrite in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods employed; such hexagonal ferrite may be employed in the present invention.

The transition metal-containing organic compound coating the surface of the hard magnetic particle will be described next.

Transition Metal-Containing Organic Compound

To control the coercive force of the magnetic particle within a range suited to recording, the transition metal-containing organic compound is desirably a salt of Fe, Co, or Ni that is capable of forming a soft magnetic material of low coercive force by thermal decomposition, and is preferably a salt of Fe. The term "salt," as used in this context, includes complexes (complex salts). So that thermal decomposition will generate few by-products, the components of the salt are desirably selected from among carbon, oxygen, and hydrogen. From this perspective, a transition metal complex having a ligand in the form of an acetylacetonate compound is desirable. Specific examples are: iron(III) acetylacetonate, cobalt (III) acetylacetonate, and nickel(III) acetylacetonate. Transition metal complexes having carbonyl compounds as ligands can also be employed. A specific example is $Co(CO)_5$. However, carbonyl iron and carbonyl nickel are highly toxic and difficult to handle industrially. Thus, it is desirable not to employ carbonyl iron and carbonyl nickel as the transition metal-containing organic compound.

The process of attaching the transition metal-containing organic compound to the surface of the hard magnetic particle can be either wet or dry. From the perspective of uniformly attaching the transition metal-containing organic compound to the surface of the hard metal particle, a wet process is desirable. One suitable wet method is to remove the solvent from a solution containing the transition metal-containing organic compound and hard metal particle to attach the transition metal-containing organic compound to the surface of the hard magnetic particle.

The solvent of the solution is not specifically limited other than it is capable of dissolving or dispersing the transition metal-containing organic compound employed; a known solvent can be employed. However, from the perspective of ease of removing the solvent, a high boiling point is undesirable. From this viewpoint, water, ketones (such as acetone), alcohols, and ethers are desirably employed. From the perspective of preventing oxidation in the course of immersing the hard magnetic particle, a solvent from which the oxygen has been removed by bubbling nitrogen or the like is desirably employed. In that process, it is possible to prevent volatilization of the solvent employed by employing nitrogen gas that has been passed through the solvent. It is also possible to employ an oily solvent, but from the perspective of ease of removing the solvent, the use of a non-oily solvent is desirable. In this regard, as well, the use of water, ketones, alcohols, and ethers is desirable.

The concentration of the transition metal-containing organic compound in the solution is not specifically limited. When the concentration is excessively low, the operation of immersing the hard magnetic particle in the solution, removing the solvent, causing the transition metal-containing organic compound to precipitate on the surface of the hard magnetic particle, and then thermally decomposing the compound to form a desired quantity of thermal decomposition product on the surface of the hard magnetic layer must be repeated numerous times. An excessively high concentration is undesirable in that the particles tend to stick together in the course of immersing the hard magnetic particle in the solution, removing the solvent, and causing the compound to precipitate on the surface of the hard magnetic particle. Taking these points into account, the concentration of the transition metal-containing organic compound in the solution is desirably about 0.1 to 10 weight percent.

From the perspective of uniformly attaching a salt to the particle surface, the quantity of hard magnetic particles in the solution is desirably a quantity that allows roughly uniform wetting of the surface of the hard magnetic particles. When dry portions remain on the surface of the particle, attaching of the compound becomes nonuniform. When the quantity of solution is excessive, nonuniform concentrations develop in the solution in the course of removing the solvent, causing the compound to attach nonuniformly.

The method of preparing the above solution is not specifically limited. The hard magnetic particles and compound can be simultaneously or sequentially admixed with the solvent to prepare the solution.

From the perspective of preventing oxidation of the hard magnetic particles, the atmosphere employed from the operation of immersing the hard magnetic particle in the solution and prior to the thermal decomposition is desirably an inert atmosphere, such as nitrogen, argon, or helium atmosphere.

The thermal decomposition of the transition metal-containing organic compound in the present invention can be conducted in a gas phase or liquid phase. Conducting the thermal decomposition in a liquid phase is desirable in that heating is conducted in the solution following the above wet processing to cause attaching of the transition metal. In that case, the heating temperature can be set to a temperature capable of thermally decomposing the compound based on the transition metal-containing organic compound employed. When conducting liquid phase thermal decomposition, a solvent that does not dissolve the transition metal-containing organic compound employed is desirably used as the solvent for preparing the solution.

Additionally, when conducting gas phase thermal decomposition after attaching a transition metal by a wet method, the solvent is desirably removed from the solution following preparation of the solution. This makes it possible to cause the transition metal-containing organic compound to precipitate on the surface of the hard magnetic particle. The solvent can be readily removed from the solution by a heat treatment, reduced pressure treatment, or a combination of the two. The heating temperature in the heat treatment can be set based on the boiling point of the solvent. However, even when conducting the treatment in an inert atmosphere as set forth above, an excessively high temperature will sometimes cause the hard magnetic particle to be oxidized by oxygen contained as an impurity in the atmosphere. From the perspective of preventing such oxidation, the heating temperature is desirably about 25 to 250° C., preferably about 25 to 150° C. In the course of removing the solvent by heating, the particles tend to aggregate. Thus, it is desirable to remove the solvent over time at a low temperature. Suitably stirring the solution while removing the solvent can cause the transition metal-containing organic compound to uniformly precipitate out onto the surface of the hard magnetic particles. Further, to prevent oxidation and aggregation of particles, it is desirable to remove the solvent by means of a reduced pressure treatment. The reduced pressure treatment can be conducted with an aspirator or rotary pump at a reduced pressure of 0.1 to 8,000 Pa. In this process, the solvent that is removed is desirably captured with a cold trap. Since the temperature of the sample drops due to the heat of vaporization accompanying volatilization of the solvent during the reduced pressure treatment, thereby diminishing the efficiency of solvent removal, heating to 25 to 50° C. is a desirable countermeasure.

The transition metal-containing organic compound can be caused to precipitate out onto the surface of the hard magnetic particles by means of the above operation. Normally, the precipitated transition metal-containing compound will be present on the surface of the hard magnetic particles as a coating layer. The thickness of the coating layer can be suitably adjusted by means of the solution concentration and the like so that a suitable quantity of thermal decomposition product is formed on the surface of the hard magnetic particles. The coating layer that is formed in this process does not have to cover the entire surface of the hard magnetic particles; it is acceptable for there to be portions where the surface of the hard magnetic particles is exposed or portions where other materials are deposited.

Gas phase thermal decomposition can be conducted by subjecting the surface of the hard magnetic particles on which the transition metal-containing organic compound has been attached to a dry heat treatment. The heat treatment can be conducted in an oxidizing atmosphere (such as in air), a reducing atmosphere (such as an atmosphere containing a reducing gas such as hydrogen, carbon monoxide, or a hydrocarbon), an inert gas atmosphere (such as a nitrogen, He, Ne, or Ar atmosphere), or under a vacuum. From the perspective of the magnetic properties of the magnetic particles obtained, it is desirable to conduct the thermal decomposition in an inert gas atmosphere or under a vacuum, and preferable to conduct the thermal decomposition in an inert gas atmosphere. The thermal decomposition temperature normally falls within a range of 300 to 550° C., and can be set to a temperature capable of thermally decomposing the transition metal-containing organic compound employed.

A thermal decomposition product of the transition metal-containing organic compound can be formed on the surface of the hard magnetic particles by the above-described process. According to the above process, while maintaining the thermal stability deriving from the hard magnetic particles, the coercive force of the magnetic particles can be lowered to below the coercive force of the hard magnetic particles and control within a range suited to recording.

From the perspectives of exchange coupling with the hard magnetic phase and controlling the coercive force of the magnetic particles at a value suited to magnetic recording, the constant of crystal magnetic anisotropy of the thermal decomposition product formed is desirably as low as possible, and can even be a negative value. However, when exchange coupling is generated between a thermal decomposition product having a negative constant of crystal magnetic anisotropy and a hard magnetic phase, the magnetic energy of the magnetic particles ends up decreasing. Thus, the constant of crystal magnetic anisotropy of the thermal decomposition product is desirably 0 to $5\times10^{-2}$ J/cc (0 to $5\times10^{5}$ erg/cc), preferably 0 to $1\times10^{-2}$ J/cc (0 to $1\times10^{5}$ erg/cc).

From the perspectives of exchange coupling with the hard magnetic phase and controlling the coercive force of the magnetic particles to a value suited to magnetic recording, the saturation magnetization of the thermal decomposition product is desirably as high as possible. Specifically, it desirably falls within a range of $1\times10^{-1}$ to 2 $A\cdot m^2/g$ (100 to 2,000 emu/g), preferably within a range of $3\times10^{-1}$ to 1.8 $A\cdot m^2/g$ (300 to 1,800 emu/g).

The thermal decomposition product is desirably a soft magnetic material of lower coercive force than the hard magnetic phase within the particle. Specifically, it desirably contains Fe, a Fe alloy, or a Fe compound, such as iron, Permalloy, sendust, or soft ferrite.

As set forth above, the magnetic particle of the present invention has a core/shell structure with a hard magnetic particle as the core and the above thermal decomposition product as the shell. The shell portion is surmised to be a soft magnetic material of lower coercive force than the core portion (hard magnetic particle), and to exchange couple with the core portion. From the perspective of controlling the coercive force of the magnetic particle to a value suited to magnetic recording, the constant of crystal magnetic anisotropy of thermal decomposition product (shell) is desirably 0.01 to 0.3-fold that of the hard magnetic particle (core). In the present invention, the term “core/shell structure” does not require that the total surface of the core be covered with the shell portion; a structure with portions where the core is exposed or portions where other materials are deposited is still covered under the core/shell structure of the present invention.

In the magnetic particle of the present invention, from the perspective of controlling the coercive force of the magnetic particle to a value suited to magnetic recording, the volumetric ratio of the hard magnetic particle to the thermal decomposition product of the transition metal-containing organic compound formed on the surface thereof (hard magnetic particle/thermal decomposition product) is desirably from 200/1 to 1/15, preferably from 2/1 to 1/20, and more preferably, from 1/1 to 1/15. In the magnetic particle of the present invention, the thickness of the thermal decomposition product (shell) covering the hard magnetic particle (core) is not specifically limited. It is desirably set to a suitable value yielding the above desirable volumetric ratio. For example, the volumetric ratio can be controlled by means of the quantity of transition metal-containing organic compound attaching to the surface of the hard magnetic particle. As set forth above, in the magnetic particle of the present invention, it is not necessary for the entire surface of the hard magnetic particle to be covered with the thermal decomposition product; some of the hard magnetic particles can be exposed in portions, and there can be portions where other materials have been deposited.

An oxide layer can be present on the outermost surface of the magnetic particle of the present invention to enhance storage stability. The method of forming the oxide layer is not specifically limited. It can be formed using any of the usual slow oxidation treatments.

The particle diameter of the magnetic particle of the present invention is desirably 5 to 200 nm, preferably 5 to 25 nm. Microparticles are desirable in terms of electromagnetic characteristics such as the SNR, but with excessively small particles, the hard magnetic phase exhibits superparamagnetism and is unsuited to recording. In a structure in which the above thermal decomposition product is present on the surface of hard magnetic particles, it is necessary for the hard magnetic particle serving as the core portion to be smaller than the magnetic particle that is finally obtained; this requirement is stricter than for the individual particles. When the particle diameter exceeds 200 nm, particles suited to recording and reproduction in a single composition structure will be present without special processing. Accordingly, the magnetic particle of the present invention is desirably a particle with a particle diameter of equal to or lower than 200 nm, it being difficult to obtain particles suited to recording and reproduction as single composition magnetic particles having such a particle diameter.

By thermally decomposing a transition metal-containing organic compound on the surface of a hard magnetic particle which, by itself, would be unsuited to recording due to high coercive force, it is possible to achieve a coercive force suitable to recording in the magnetic particle of the present invention. This is presumed to occur because the spin of the hard magnetic particle tends to change due to the effect of the spin in the thermal decomposition product with which it exchange couples, yielding a coercive force that is suited to recording. The coercive force of the magnetic particle of the present invention is desirably lower than the coercive force of the hard magnetic particle constituting the core, desirably falling within a range of equal to or higher than 80 kA/m but lower than 230 kA/m. When the coercive force is excessively low, it becomes difficult to maintain recording due to the effects of adjacent recorded bits, and thermal stability deteriorates. When the coercive force is excessively high, recording becomes impossible. The coercive force is preferably equal to or higher than 160 kA/m but less than 230 kA/m. As stated above, the coercive force of the hard magnetic particle is equal to or higher than 230 kA/m, but there is no specific upper limit. The coercive force of the hard magnetic materials that are generally available is normally equal to or lower than 1,000 kA/m. As set forth above, the coercive force of the thermal decomposition product that is formed on the surface of the hard magnetic particle is desirably less than 8 kA/m. There is no specific lower limit. Generally, the coercive force of a common soft magnetic material will be equal to or higher than 0.04 kA/m, for example.

The saturation magnetization of the magnetic particle of the present invention can be controlled by means of the saturation magnetization of the hard magnetic particle that is employed, for example. It desirably falls within a range of $0.4\times10^{-1}$ to 2.2 $A\cdot m^2/g$ (40 to 2,200 emu/g), preferably within a range of $1\times10^{-1}$ to 2.2 $A\cdot m^2/g$ (100 to 2,200 emu/g), and more preferably, within a range of $1.2\times10^{-1}$ to 1.8 $A\cdot m^2/g$ (120 to 1,800 emu/g). Having such a saturation magnetization range is advantageous to output.

As indicated in Examples further below, the present invention further provides a magnetic particle, which comprises a hard magnetic particle and a thermal decomposition product of a transition metal-containing organic compound deposited on a surface of the hard magnetic particle in a state where the thermal decomposition product is exchange-coupled with the hard magnetic particle. As indicated in Examples, the magnetic particle can have a lower coercive force than the hard magnetic particle, making it possible to exhibit good recording properties while maintaining high thermal stability due to the hard magnetic particle.

Reference can be made to the description of the magnetic particle and the method of preparing it set forth above for details concerning the above magnetic particle. As stated above, and as indicated in Examples further below, thermal decomposition product can be formed by gas phase thermal decomposition, and the transition metal-containing organic composition can be a transition metal complex having a ligand in the form of an acetylacetonate compound.

Since the magnetic particle of the present invention can afford both good recording properties and thermal stability, it is suitable as magnetic powder for magnetic recording. Further, the magnetic particle of the present invention, in contrast to Technique 2 set forth above, can be prepared without requiring high-temperature processing on a support. Thus, a magnetic layer can be formed by mixing the magnetic particle with a binder and solvent to obtain a coating liquid, which is then coated on a support. Accordingly, the magnetic particle of the present invention is suited to applications in particulate magnetic recording media.

EXAMPLES

The present invention will be described in detail below based on Examples. However, the present invention is not limited to the examples.

Example 1

(1) Iron (III) acetylacetonate was dissolved in acetone to prepare a 6 weight percent red solution.

(2) Barium ferrite (denoted as "BaFe" hereinafter) (Hc: 235 kA/m, saturation magnetization $4.5\times10^{-2}$ $A\cdot m^2/g$ (45 emu/g), average plate diameter 35 nm, average plate thickness 8 nm) was immersed in the solution to wet the surface of the particles (1 g of solution (iron(III) acetylacetonate content: 340 μmol) was employed per gram of BaFe particles). The solvent was then removed while reducing the pressure with an aspirator. In this process, the particles in the solution were stirred every 30 minutes.

(3) The dry powder obtained by removing the solvent in (2) above was heat treated for one hour at 350° C. under a nitrogen gas flow in a heating furnace (a QH-P810P gold image furnace made by ULVAC-RIKO, Inc.) to thermally decompose the iron(III) acetylacetonate that had precipitated on (attached to) the surface of the BaFe particles.

Examples 2 to 4

Magnetic particles were processed by the same method as in Example 1, with the exception that the concentration of the iron(III) acetylacetonate solution was altered to change the quantity of iron(III) acetylacetonate per gram of BaFe particles to the values indicated in Table 1.

Comparative Example 1

BaFe particles (Hc: 235 kA/m, saturation magnetization $4.5\times10^{-2}$ A·m$^2$/g (45 emu/g), average plate diameter 35 nm, average plate thickness 8 nm) themselves were employed as magnetic particles in Comparative Example 1.

Comparative Example 2

The heat treatment of (3) was conducted on BaFe particles (Hc: 235 kA/m, saturation magnetization $4.5\times10^{-2}$ A·m$^2$/g (45 emu/g), average plate diameter 35 nm, average plate thickness 8 nm) without conducting (1) and (2) in Example 1.

Evaluation of Magnetic Particles (1) Evaluation of Magnetic Characteristics

The magnetic characteristics of the magnetic particles of Examples 1 to 4 and Comparative Examples 1 and 2 were evaluated using a superconducting vibrating sample magnetometer (VSM) made by Tamakawa Co. under conditions of an applied magnetic field of 3,184 kA/m (40 kOe). Each magnetic particle was sealed in an acrylic vessel under a nitrogen atmosphere for evaluation to prevent rapid oxidation. The results are given in Table 1.

(2) Gradient of Decay of Magnetization Over Time

The gradient of decay of magnetization over time in a diamagnetic field of 800 Oe (about 64 kA/m) corresponding to the diamagnetic field exposure during storage of a magnetic recording medium was determined by the following procedure with a superconducting electromagnet VSM (model TM-VSM1450-SM, made by Tamakawa Co.) for the magnetic particles of Examples 1 to 4 and Comparative Examples 1 and 2. A 0.1 g quantity of magnetic powder was tightly packed into a measurement holder for use as the sample in measurement.

In the case of thermal fluctuation magnetic aftereffects, $\Delta M/(Int_1-Int_2)$ becomes constant in the decay of magnetization over time. Since magnetization also varies depending on the magnetic field, the gradient of the decay of magnetization over time was determined by measuring the magnetization once each increment of time after the magnetic field had been stabilized.

An external magnetic field of 40 kOe (about 3,200 kA/m) was applied to the sample. Following direct-current erasure, the magnet was controlled by means of current and current was supplied to generate the target demagnetizing field. The external magnetic field was gradually brought closer to the target demagnetizing field. This was to prevent the decay of magnetization over time from appearing to decrease due to stable processing by varying the external magnetic field.

Designating the time when the magnetic field had reached the target value as the base point in measurement, the magnetization was measured for 25 minutes once every 1 minute and the gradient of the decay of magnetization over time $\Delta M/(Int_1-Int_2)$ was obtained. The results are given in Table 1. In Table 1, the value given was obtained by dividing $\Delta M/(Int_1-Int_2)$ by the magnetization in a 40 kOe external magnetic field and normalizing the result.

TABLE 1

| | Quantity of Iron (III) acetylacetonate (per 1 g of BaFe particles) | Coercive force | Saturation magnetization | Gradient of decay of magnetization over time (1/ln(s)) diamagnetic field 800 Oe |
|---|---|---|---|---|
| Ex. 1 | 340 μmol | 185 kA/m (2322 Oe) | $0.43\times10^{-1}$ A·m$^2$/g (43 emu/g) | −0.0031 |
| Ex. 2 | 170 μmol | 183 kA/m (2302 Oe) | $0.42\times10^{-1}$ A·m$^2$/g (42 emu/g) | −0.0031 |
| Ex. 3 | 110 μmol | 183 kA/m (2295 Oe) | $0.44\times10^{-1}$ A·m$^2$/g (44 emu/g) | −0.0034 |
| Ex. 4 | 70 μmol | 182 kA/m (2291 Oe) | $0.45\times10^{-1}$ A·m$^2$/g (45 emu/g) | −0.0026 |
| Comp. Ex. 1 | — | 235 kA/m (2950 Oe) | $0.45\times10^{-1}$ A·m$^2$/g (45 emu/g) | −0.0024 |
| Comp. Ex. 2 | — | 231 kA/m (2900 Oe) | $0.44\times10^{-1}$ A·m$^2$/g (44 emu/g) | −0.0023 |

Evaluation Results

Table 1 indicates that the magnetic particle of Comparative Example 2 exhibited a coercive force roughly equal to that of untreated BaFe particles (Comparative Example 1). Thus, it was found that a simple heat treatment did not improve the coercive force of the hard magnetic particles. By contrast, the fact that the coercive force of the magnetic particles of Examples 1 to 4 was lower than that of the untreated BaFe particles indicated that the thermal decomposition product of iron(III) acetylacetonate on the surface of the BaFe particles (hard magnetic phase) underwent exchange coupling in the magnetic particles of Examples 1 to 4, resulting in improved recording properties. It was possible to lower the coercive force of the magnetic particles by attaching a transition metal-containing organic compound and thermally decomposing it on the surface of the hard magnetic particles in this manner. The coercive force of Examples 1 to 4 exhibit differences of about 1 to 3 kA/m; this is within the scope of measurement variation. Normally, the greater the quantities of transition metal-containing organic compound that attaches, the greater the coercive force-lowering effect is thought to be.

The gradient of decay of magnetization over time that was measured by the above method is an indicator of the thermal stability of the magnetic particle. As indicated in Table 1, the gradient of decay of magnetization over time of the magnetic particles of Example 1 to 4 was similar to that of Comparative Example 1 and 2. Thus, it was determined that the thermal stability of the magnetic particles was well maintained without loss even when iron(III) acetylacetonate was thermally decomposed on the surface of the hard magnetic particles.

Based on these evaluation results, it was determined that the magnetic particles obtained by thermally decomposing a transition metal-containing organic compound on the surface of hard magnetic particles had good thermal stability and a coercive force that was controlled within a range suited to recording, and were thus suited to high-density recording. As shown in Table 1, the saturation magnetization of the magnetic particles of Examples 1 to 4 was roughly identical to that of the untreated BaFe particles (Comparative Example 1). Thus, it was also determined that the saturation magnetization of magnetic particles could be controlled by means of the saturation magnetization of the hard magnetic particle employed.

The magnetic particle of the present invention is suitable for use in inexpensive particulate magnetic recording media.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of preparing a magnetic particle, which comprises attaching a transition metal-containing organic compound to a surface of a hard magnetic particle and then thermally decomposing the transition metal-containing organic compound to obtain the magnetic particle, wherein the magnetic particle obtained has a coercive force lower than that of the hard magnetic particle and the hard magnetic particle is hexagonal ferrite.

2. The method of preparing a magnetic particle according to claim 1, wherein the thermal decomposition is carried out by gas phase thermal decomposition.

3. The method of preparing a magnetic particle according to claim 1, wherein the transition metal-containing organic compound is a transition metal complex having a ligand in the form of an acetylacetonate compound.

4. The method of preparing a magnetic particle according to claim 1, which comprises attaching the transition metal-containing organic compound to the surface of the hard magnetic particle by removing a solvent from a solution containing the transition metal-containing organic compound and the hard magnetic particle.

5. A magnetic particle obtained by the method of preparing according to claim 1.

6. The magnetic particle according to claim 5, which comprises a hard magnetic particle and a thermal decomposition product of a transition metal-containing organic compound deposited on a surface of the hard magnetic particle in a state where the thermal decomposition product is exchange-coupled with the hard magnetic particle, wherein the thermal decomposition product is a soft magnetic material.

7. The magnetic particle according to claim 6, wherein the transition metal-containing organic compound is a transition metal complex having a ligand in the form of an acetylacetonate compound.

8. The magnetic particle according to claim 6, wherein the thermal decomposition product is a gas phase thermal decomposition product of the transition metal-containing organic compound.

9. The magnetic particle according to claim 6, which has a coercive force of equal to or higher than 80 kA/m but less than 230 kA/m.

10. The magnetic particle according to claim 5, which is employed as magnetic powder for a particulate magnetic recording medium.

* * * * *